(12) United States Patent
Kodama

(10) Patent No.: US 8,819,796 B2
(45) Date of Patent: Aug. 26, 2014

(54) AUTHENTICATION SYSTEM AND METHOD

(76) Inventor: Shoji Kodama, Hiroshima (JP)

( * ) Notice: Subject to any disclaimer, the term of this patent is extended or adjusted under 35 U.S.C. 154(b) by 0 days.

(21) Appl. No.: 13/384,106

(22) PCT Filed: Jun. 13, 2011

(86) PCT No.: PCT/JP2011/063507
§ 371 (c)(1),
(2), (4) Date: Jan. 13, 2012

(87) PCT Pub. No.: WO2012/160710
PCT Pub. Date: Nov. 29, 2012

(65) Prior Publication Data
US 2014/0090035 A1 Mar. 27, 2014

(30) Foreign Application Priority Data
May 24, 2011 (JP) ................................ 2011-115522

(51) Int. Cl.
G06F 17/30 (2006.01)
H04L 29/06 (2006.01)
G06F 21/31 (2013.01)
G06F 21/41 (2013.01)
G06F 21/36 (2013.01)

(52) U.S. Cl.
CPC .............. H04L 63/083 (2013.01); G06F 21/31 (2013.01); G06F 21/41 (2013.01); G06F 21/36 (2013.01)
USPC ........ 726/6; 726/1; 726/2; 713/155; 713/182; 713/186

(58) Field of Classification Search
USPC ........................ 726/1–2, 6; 713/155, 182, 186
See application file for complete search history.

(56) References Cited

U.S. PATENT DOCUMENTS

| 8,549,317 | B2 * | 10/2013 | Funayama | 713/186 |
| 2007/0277224 | A1 * | 11/2007 | Osborn et al. | 726/2 |
| 2010/0293605 | A1 | 11/2010 | Longobardi | |
| 2011/0047606 | A1 | 2/2011 | Blomquist et al. | |

FOREIGN PATENT DOCUMENTS

| JP | 2001-216264 | 8/2001 |
| JP | 2004-295252 | 10/2004 |
| WO | 2009/039223 | 3/2009 |

OTHER PUBLICATIONS

Japan Patent Office, Written Opinion of the International Searching Authority for PCT Application No. PCT/JP2011/063507, mail date Jul. 5, 2011.
European Patent Office, Extended European Search Report for EP Application No. 11802840.6, mail date Nov. 6, 2013.

* cited by examiner

Primary Examiner — Thanhnga B Truong
(74) Attorney, Agent, or Firm — SoCal IP Law Group LLP; Steven C. Sereboff; John E. Gunther

(57) ABSTRACT

Security is improved as compared to the security of conventional authentication systems, only by requesting a user to perform operations involving the same number of operations as that of the conventional authentication systems. When login information is registered, an authentication system (1, 1A) accepts registration of a type of a login image that composes an authentication button for initiating user authentication. When displaying an authentication page that is used for user authentication, the authentication system (1, 1A) displays buttons including the authentication button composed of the login image and dummy buttons composed of other images. The authentication system (1, 1A) performs user authentication in a case in which an operation button selected by the user is the authentication button.

13 Claims, 11 Drawing Sheets

FIG. 2

LOGIN INFORMATION STORING UNIT 213

| SERVICE | TERMINAL IDENTIFICATION INFORMATION | USER ID | PASSWORD |
|---|---|---|---|
| URL (ADMINISTRATIVE SERVER 3) | ABCDE | A0123 | * * * * |
| ... | ... | ... | ... |

FIG. 3

USER INFORMATION STORING UNIT 312

| TERMINAL IDENTIFICATION INFORMATION | USER ID | PASSWORD | LOGIN IMAGE ID | ... |
|---|---|---|---|---|
| ABCDE | A0123 | * * * * | G01 | ... |
| XYZ00 | A999 | * * * * * * | G99 | ... |
| ... | ... | ... | ... | ... |

FIG. 4

LOGIN IMAGE STORING UNIT 313

| IMAGE ID | CATEGORY | ATTRIBUTE 1 (SHAPE) | ATTRIBUTE 2 (COLOR) | SELECTED USER ID | ... |
|---|---|---|---|---|---|
| G01 | CAR | SEDAN | WHITE | A0123, A0374, A3712 ... | ... |
| G02 | | SPORTS CAR | RED | ... | ... |
| ... | | ... | ... | ... | ... |
| G78 | DOG | RETRIEVER | BLACK | ... | ... |
| ... | ... | ... | ... | ... | ... |

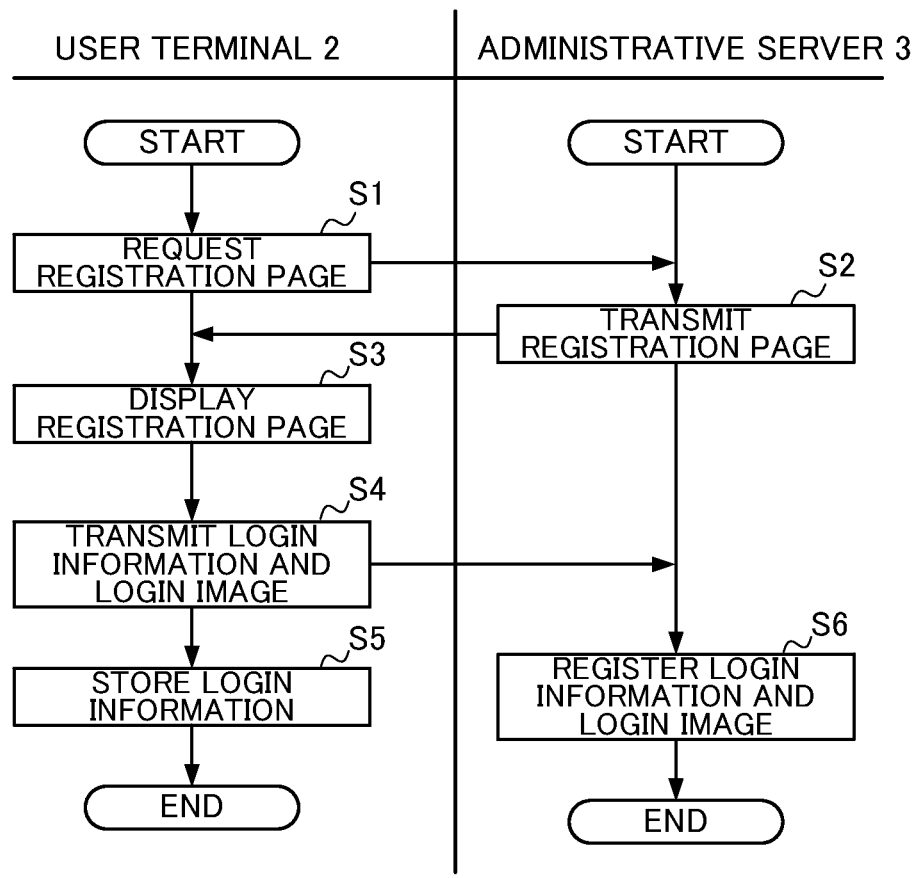

FIG. 8
(1) REQUEST OF AUTHENTICATION PAGE (FIRST LOGIN PAGE)
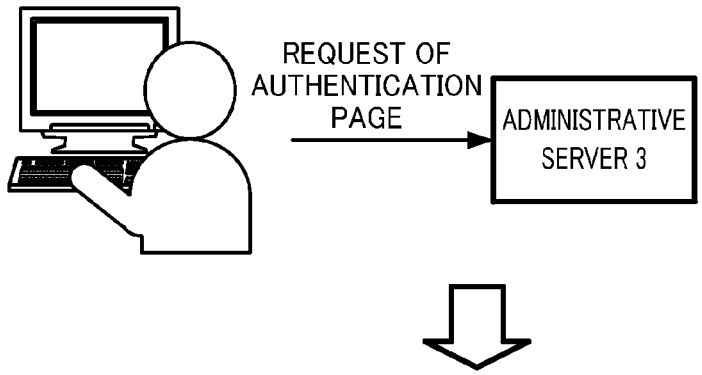
(2) DISPLAY OF AUTHENTICATION PAGE (FIRST LOGIN PAGE)
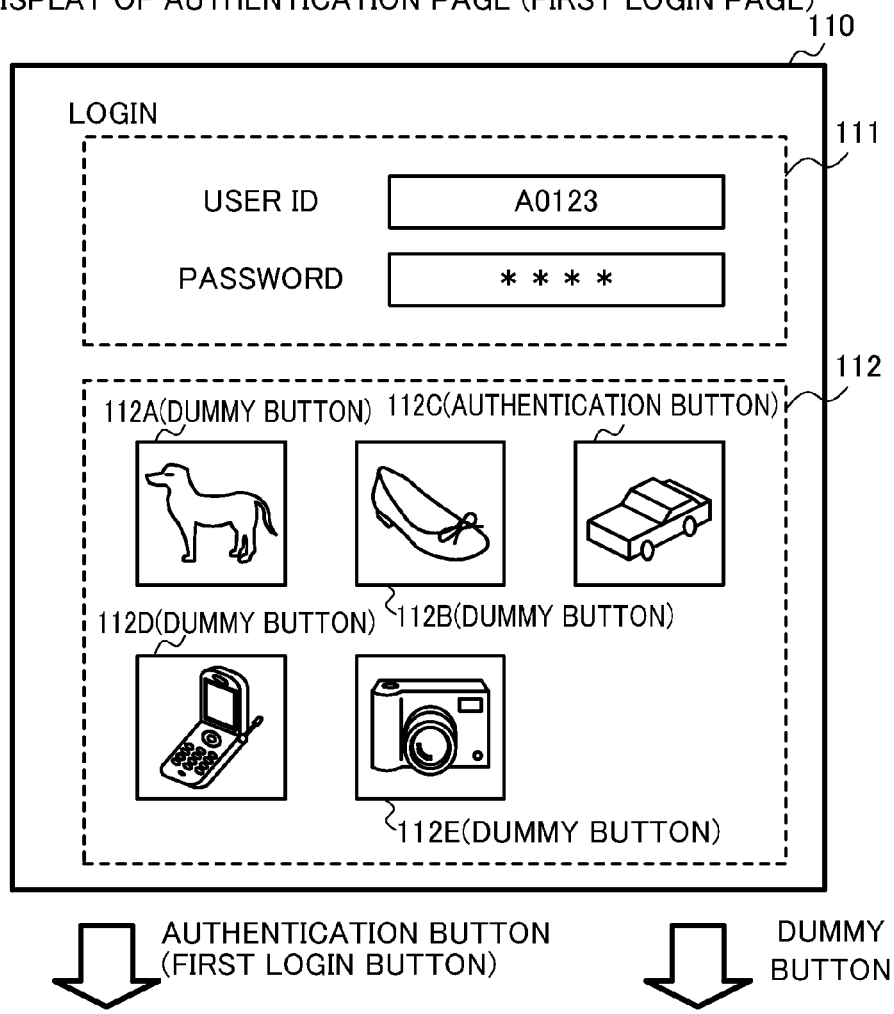
(3) AUTHENTICATION SUCCEEDS
(4) AUTHENTICATION FAILS (AUTHENTICATION PAGE IS REDISPLAYED)

FIG. 9
(4-1) REDISPLAY 1 OF AUTHENTICATION PAGE (FIRST LOGIN PAGE)
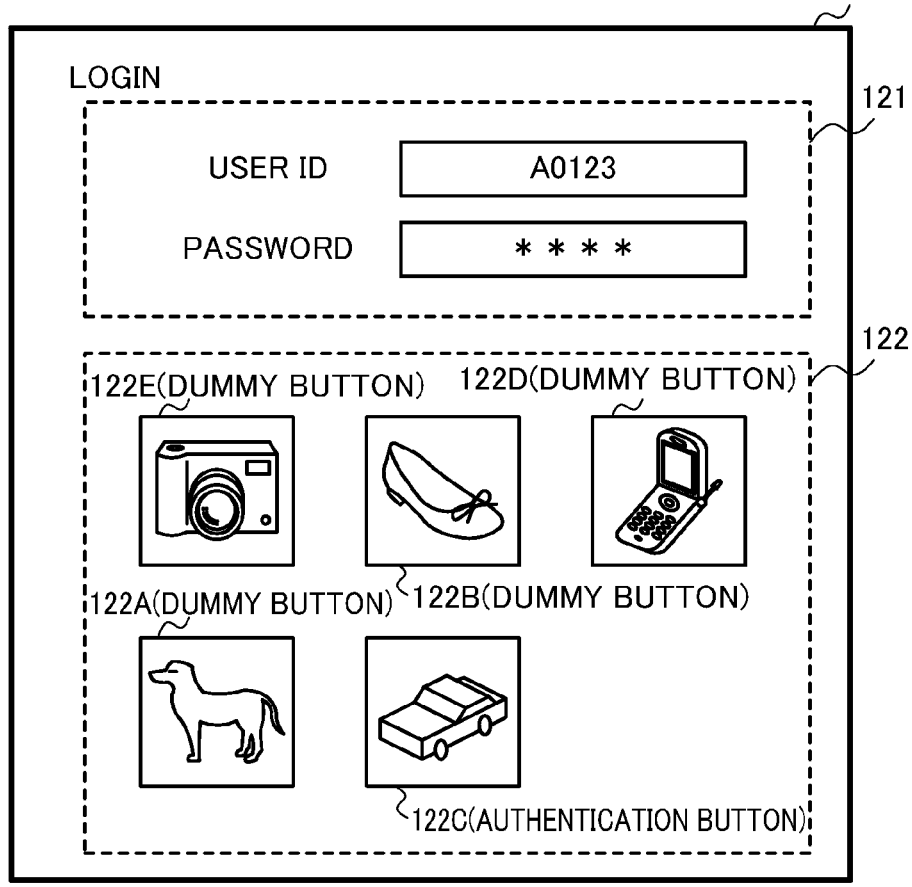
(4-2) REDISPLAY 2 OF AUTHENTICATION PAGE (FIRST LOGIN PAGE)
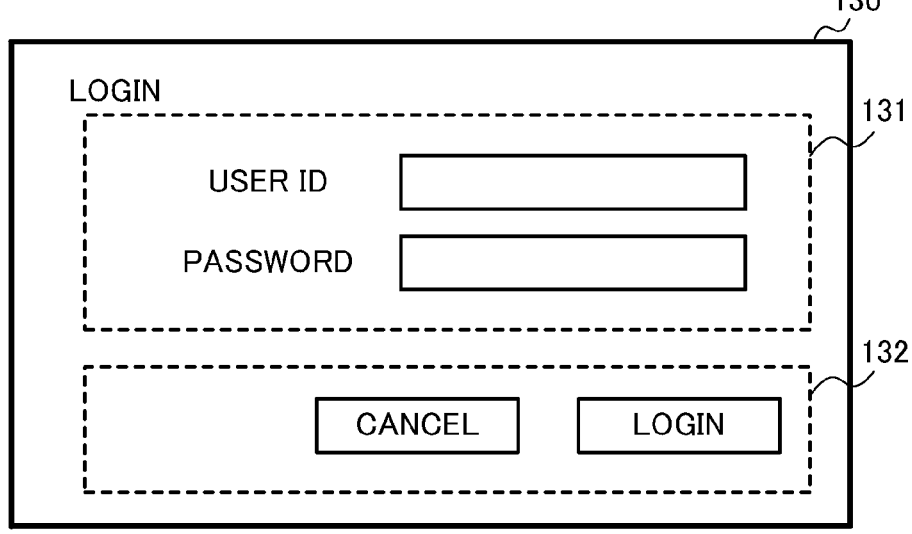

FIG. 11
(1) DISPLAY OF AUTHENTICATION PAGE
(SECOND LOGIN PAGE)
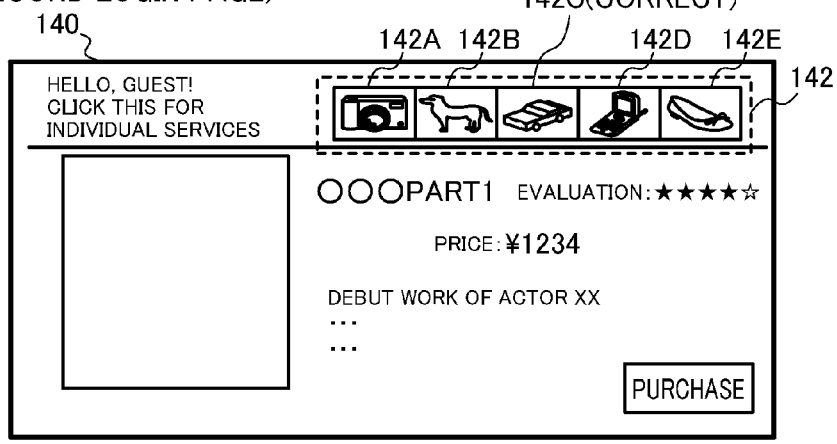
AUTHENTICATION BUTTON
(SECOND LOGIN BUTTON)
DUMMY BUTTON
(2) DISPLAY OF FIRST LOGIN PAGE
(ID AND PASSWORD HAVE BEEN INPUT)
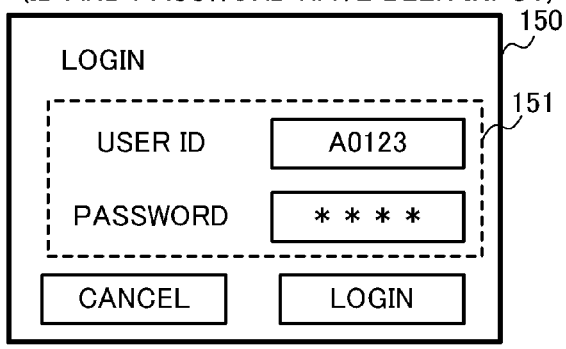
(3) DISPLAY OF FIRST LOGIN PAGE
(ID AND PASSWORD HAVE NOT BEEN INPUT)
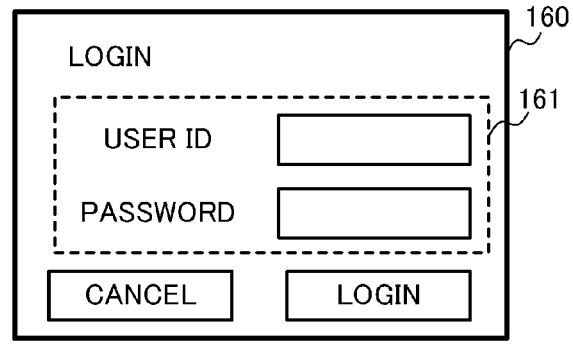

FIG. 12
(1) AUTHENTICATION PAGE
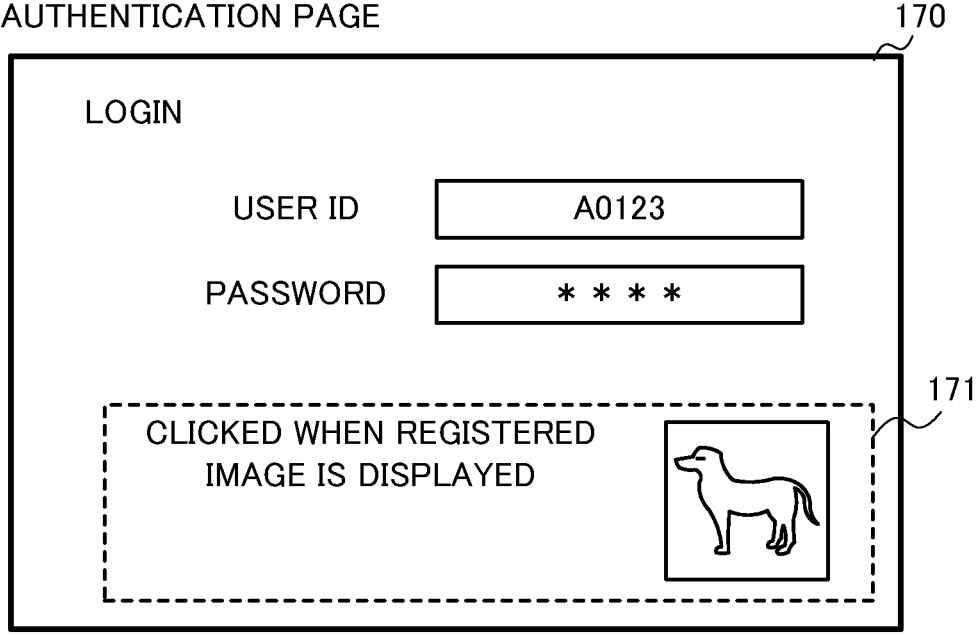
(2) AUTHENTICATION BUTTON
(A) TIME t1 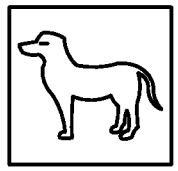 ⇒ (B) TIME t2  ⇒ (C) TIME t3 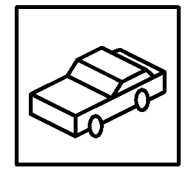
... ⇐ (E) TIME t5 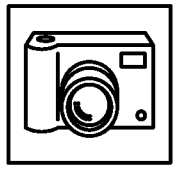 ⇐ (D) TIME t4 

FIG. 13
(1) FIRST LOGIN PAGE (FIRST LOGIN BUTTON)
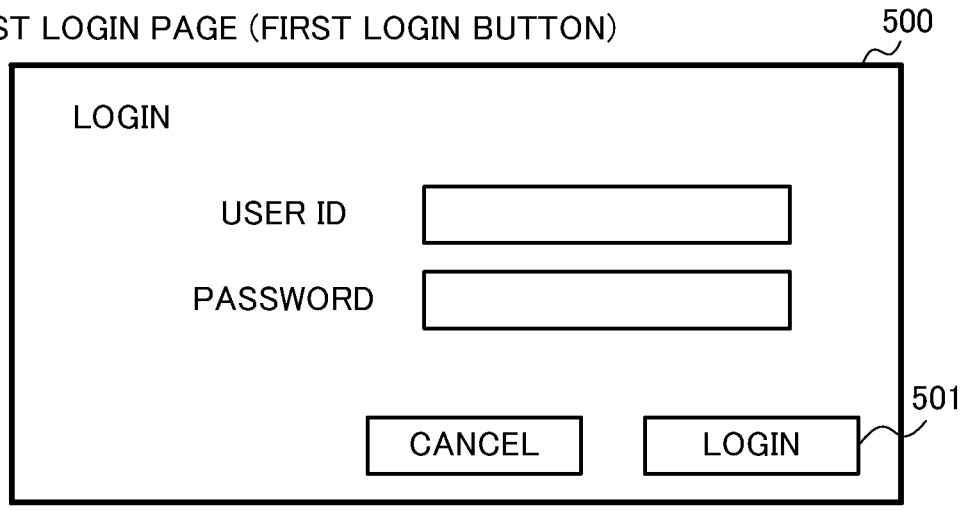
CLICK SECOND LOGIN BUTTON TO TRANSITION
(2) SECOND LOGIN PAGE (SECOND LOGIN BUTTON)
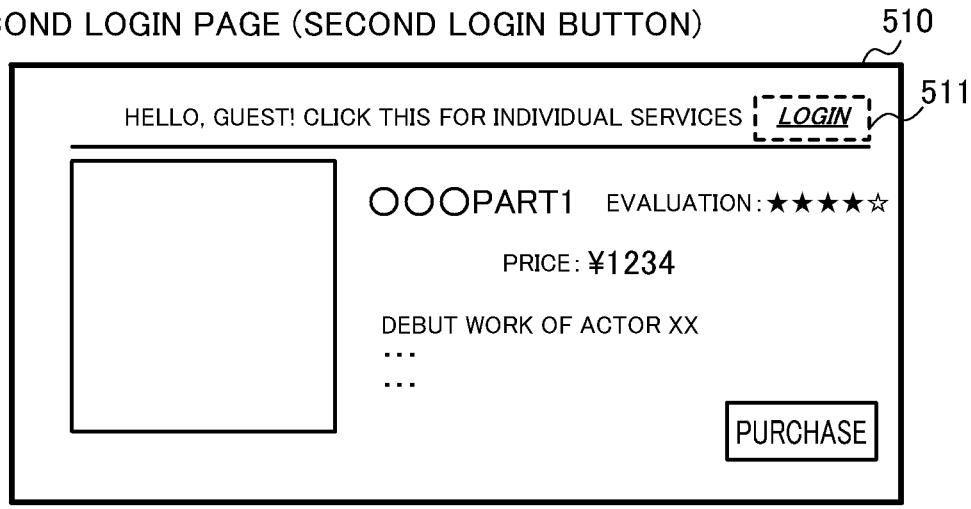

AUTHENTICATION SYSTEM AND METHOD

CROSS-REFERENCE TO RELATED APPLICATIONS

This application is a National Stage Application filed under 35 U.S.C. §371 and claims the benefit of priority to International Patent Application PCT/JP2011/063507, filed Jun. 13, 2011, which claims priority to Japanese Patent Application No. 2011-115522, filed May 24, 2011.

TECHNICAL FIELD

The present invention relates to an authentication system and method for performing user authentication based on login information that includes a user ID and a password for identifying a user.

BACKGROUND ART

With the development of network environments in recent years, user authentication is required of users in various situations. Typically, user authentication is required in cases where on-line services such as on-line shopping or email services are provided; and in addition, user authentication is required from the viewpoint of internal administration in such a case in which accessible information is restricted for each department even on a closed network such as an enterprise network.

User authentication requires a user ID and a password (login information) to be input; however, in recent years, in order to improve the convenience (usability) for users, a mechanism for automatically inputting login information has been developed (for example, Patent Document 1).

There are various methods of implementing a mechanism for automatically inputting login information, such as, for example, a method in which login information is stored in a browser of a user terminal, and the login information is automatically input inside the user terminal, and a method in which login information is stored in an administrative server on a network, and based on a request (involving cookie information) from a user terminal, a web page, into which the login information has been automatically input, is displayed on the user terminal.

Patent Document 1: Japanese Unexamined Patent Application, Publication No. 2004-295252

DISCLOSURE OF THE INVENTION

Problems to be Solved by the Invention

Such an automatic input of login information improves the usability, but encourages spoofing by a third party on the other hand; therefore, new measures are required to be taken from the viewpoint of improving the security.

Accordingly, in recent years, there are also known services in which a second password is required to be input for user authentication in addition to a user ID and a password; however, requiring a second password when automatically inputting login information considerably compromises the usability, and loses the significance of the automatic input. Moreover, since the possibility of spoofing to be performed by a third party varies depending on the terminal environment of the user (for example, whether an operation by a third party is easy), it is also conceivable to provide a function to allow a user to select whether to apply an automatic input of login information; however, further measures are required from the viewpoint of usability.

Therefore, an object of the present invention is to provide an authentication system and method that achieve improvement of security regardless of the user's terminal environment, while securing usability by automatically inputting login information. More specifically, the present invention make it possible to improve security as compared to the security of conventional authentication systems, only by requesting a user to perform operations involving the same number of operations as that of the conventional authentication systems.

Here, with reference to FIG. 13, a web page 500 (FIG. 13 (1)) that includes an entry field for inputting login information is used for user authentication; however, depending on the authentication system, a web page 510 (FIG. 13 (2)) for transitioning to such a web page 500 may be used in some cases.

In the following descriptions, the web page 500 including an entry field for inputting login information is referred to as a "first login page", the web page 510 for transitioning to the first login page is referred to as a "second login page", and the first login page and the second login page are collectively referred to as an "authentication page".

In addition, the second login page transitions to the first login page on condition that a login button 511 shown in FIG. 13 (2) is operated; and user authentication is performed on condition that a login button 501 shown in FIG. 13 (1) is operated after inputting login information on the first login page.

In the following descriptions, the login button 501 operated in the first login page is referred to as a "first login button", the login button 511 operated in the second login page is referred to as a "second login button", and the first login button and the second login button are collectively referred to as an "authentication button".

Here, "performing user authentication in a case of determining that an authentication button was selected" includes performing user authentication on condition that the first login button is operated, and in addition, performing user authentication by transitioning to the first login page (i.e. via the first login page) on condition that the second login button is operated.

Means for Solving the Problems

A first aspect of the present invention is an authentication system that performs user authentication based on login information that includes a user ID and a password for identifying a user, and the authentication system includes: registration accepting unit for accepting registration of a type of a login image that composes an authentication button for initiating the user authentication when the login information is registered; authentication page displaying unit for displaying an authentication page on a user terminal in response to a request from the user terminal, the authentication page displaying a plurality of operation buttons that include an authentication button composed of the login image accepted by the registration accepting unit and dummy buttons composed of images different from the login image; login image determining unit for determining a type of an operation button selected on the authentication page by a user of the user terminal; and authenticating unit for performing the user authentication in a case in which the login image determining unit determines that the authentication button was selected.

According to the authentication system of the first aspect, when login information (a user ID and a password) is registered, registration of a type of a login image is accepted from a user, and when authentication is performed, the authentication page displays a plurality of operation buttons that include an authentication button composed of the login image accepted, and dummy buttons composed of images different from the login image. In addition, user authentication is performed in a case in which the user operates the authentication button that is composed of the login image among the images of the plurality of operation buttons.

As a result, it is possible to prevent user authentication from being performed by a third party who does not know the type of the login image. Here, the user's operation required in the authentication system of the first aspect is only selection of the authentication button, which corresponds to selection of the first login button required of the user in conventional authentication systems; therefore, security can be improved as compared to the security of the conventional authentication systems, only by requesting the user to perform the same number of operations as that of the conventional authentication systems.

A second aspect of the present invention is the authentication system as recited in the first aspect, in which the authentication page is a first login page that includes the plurality of operation buttons and an entry field that accepts an input of the login information, and the authentication page displaying unit displays the first login page including the plurality of operation buttons on the user terminal, in which the login information has been automatically input into the entry field.

According to the authentication system of the second aspect, the plurality of operation buttons (including the authentication button and the dummy buttons) are displayed on the first login page, in which the login information has been automatically input into the entry field. As a result, even in a case in which the login information has been automatically input, it is possible to prevent user authentication from being performed by a third party who does not know the type of the login image.

A third aspect of the present invention is the authentication system as recited in the first aspect, in which the authentication page is a second login page that can transition to a first login page including an entry field that accepts an input of the login information, the authentication system further includes login page displaying unit for displaying the first login page, in which the login information has been automatically input into the entry field, on the user terminal, on condition that the login image determining unit determines that the authentication button was selected, and the authenticating unit performs the user authentication via the first login page.

According to the authentication system of the third aspect, the plurality of operation buttons (including the authentication button and the dummy buttons) are displayed on the second login page that can transition to the first login page. As a result, a third party who does not know the type of the login image cannot enjoy an automatic input of the login information, thereby making it possible to prevent the third party from spoofing. In this case, what is required of the user is only selection of the authentication button, which corresponds to selection of the second login button required in conventional authentication systems; therefore, security can be improved as compared to the security of the conventional authentication systems, only by requesting the user to perform the same number of operations as that of the conventional authentication systems.

A fourth aspect of the present invention is the authentication system as recited in any one of the first to third aspects, in which the authentication page displaying unit simultaneously displays the plurality of operation buttons.

A fifth aspect of the present invention is the authentication system as recited in any one of the first to third aspects, in which the authentication page displaying unit switches to display the plurality of operation buttons at a predetermined time interval.

Here, the plurality of operation buttons may be simultaneously displayed as in the authentication system of the fourth aspect, or may be switched to be displayed at a predetermined time interval as in the authentication system of the fifth aspect.

A sixth aspect of the present invention is the authentication system as recited in the fourth aspect, in which the authentication page displaying unit redisplays the authentication page, by sorting the plurality of operation buttons in a different order, on condition that the login image determining unit determines that any one of the dummy buttons was selected.

According to the authentication system of the sixth aspect, in a case in which a dummy button was selected among the plurality of operation buttons, the authentication page is redisplayed, by sorting the plurality of operation buttons in a different order. As a result, it is possible to prevent the authentication button from being easily selected by a third party who repeats selection at random. In this case, different images may be used as images composing dummy buttons before and after sorting the operation buttons in a different order.

A seventh aspect of the present invention is the authentication system as recited in any one of the fourth to sixth aspects, in which the authentication page displaying unit redisplays the authentication page, by changing an attribute of one or a plurality of images among images that compose the plurality of operation buttons, on condition that the login image determining unit determines that any one of the dummy buttons was selected.

According to the authentication system of the seventh aspect, in a case in which a dummy button was selected among the plurality of operation buttons, the authentication page is redisplayed, by changing an attribute of one or a plurality of images of the operation buttons. As a result, it is possible to prevent the authentication button from being easily selected by a third party who repeats selection at random.

An eighth aspect of the present invention is the authentication system as recited in any one of the first to fifth aspects, in which the authentication page displaying unit displays, on the user terminal, the first login page including an entry field without the login information being input thereinto, on condition that the login image determining unit determines that any one of the dummy buttons was selected.

According to the authentication system of the eighth aspect, in a case in which a dummy button was selected among the plurality of operation buttons, the first login page without the login information being input is displayed. As a result, it is possible to prevent spoofing by a third party who does not know the type of the login image, and user authentication can be appropriately performed even for a user who forgot the login image, by inputting login information.

A ninth aspect of the present invention is a method of performing user authentication based on login information that includes a user ID and a password for identifying a user, the method includes the steps executed by a computer of: accepting registration of a type of a login image that composes an authentication button for initiating the user authentication when the login information is registered; displaying an authentication page on a user terminal in response to a request from the user terminal, the authentication page displaying a plurality of operation buttons that include an authentication button composed of the login image accepted and dummy buttons composed of images different from the login image; determining a type of an operation button selected on the authentication page by a user of the user terminal; and performing the user authentication in a case of determining that the authentication button was selected.

According to the method of the ninth aspect, effects similar to the effects of the authentication system of the first aspect are achieved.

Effects of the Invention

According to the present invention, it is possible to improve security as compared to the security of conventional authentication systems, only by requesting a user to perform operations involving the same number of operations as that of the conventional authentication systems.

BRIEF DESCRIPTION OF THE DRAWINGS

FIG. 2 is a table showing login information storing unit;

FIG. 3 is a table showing user information storing unit;

FIG. 4 is a table showing login image storing unit;

FIG. 5 is a flowchart showing a flow of registration processing of the authentication system;

FIG. 8 is a diagram showing operations of the login processing of the authentication system;

FIG. 9 is a diagram showing operations of the login processing of the authentication system;

FIG. 11 is a diagram showing operations of the authentication system;

FIG. 12 is a diagram showing a modified embodiment of a manner of displaying operation buttons; and FIG. 13 is a diagram showing a first login page and a second login page.

PREFERRED MODE FOR CARRYING OUT THE INVENTION

Overview of Authentication System 1

An authentication system 1 of the present invention accepts selection of a login image when login information (a user ID and a password) of the user is registered, and displays, on an authentication page, an authentication button composed of the login image, together with dummy buttons composed of images other than the login image. As a result, the user who recognizes the login image can perform user authentication, while making it possible to prevent spoofing by a third party who does not know the login image.

As will be described hereinafter, in a first embodiment, a first login button (authentication button) for performing user authentication is displayed together with dummy buttons on a first login page (authentication page); and in a second embodiment, a second login button (authentication button) for transitioning to the first login page is displayed together with dummy buttons on a second login page (authentication page). Embodiments of the present invention will be hereinafter described with reference to the drawings.

First Embodiment

At first, the authentication system 1 of the first embodiment is described with reference to FIGS. 1 to 9.

Configuration of Authentication System 1

Figure 1:
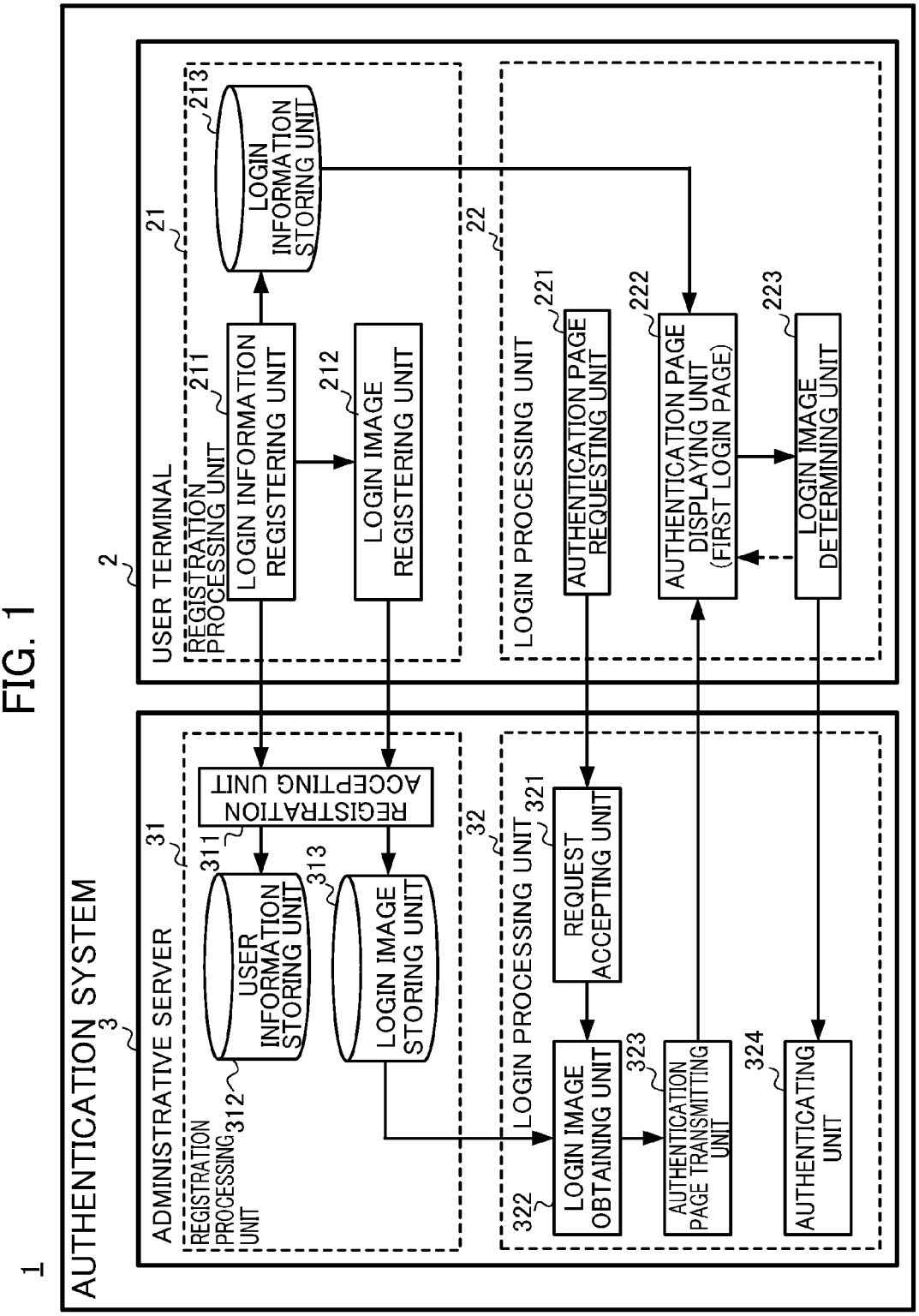
FIG. 1 is a diagram showing a configuration of an authentication system of a first embodiment.

A configuration of the authentication system 1 is described with reference to FIG. 1.

The authentication system 1 is configured by communicably connecting a user terminal 2 and an administrative server 3. The user terminal 2 is an information processing terminal used by a user, and is configured to be capable of implementing a variety of unit, which will be described later, via an existing browser or the like. The administrative server 3 is a server for managing users on networks including the Internet and an enterprise network, and performs authentication processing for a user in response to a request from the user terminal 2.

Configuration of User Terminal 2

The user terminal 2 is configured to include: a registration processing unit 21 for registering login information (a user ID and a password) and a login image; and a login processing unit 22 for performing login processing involving user authentication based on the login information and the login image.

Here, the authentication system 1 of the present invention can automatically input login information when performing login processing. It should be noted that, as described above, an automatic input of login information when performing login processing can be implemented by way of various methods such as a method in which login information is stored on a browser of the user terminal 2, and in addition, a method in which login information is stored in the administrative server 3 on the network, and based on a request (involving cookie information) from the user terminal 2, an authentication page, in which the login information has been automatically input, is displayed on the user terminal 2. The authentication system 1 of the present invention does not define a method of automatically inputting login information, and may be implemented by way of an arbitrary method. It should be noted that, in embodiments described below, an automatic input of login information is implemented by storing login information on a browser of the user terminal 2.

Registration Processing Unit 21

The registration processing unit 21 is configured to include login information registering unit 211, login image registering unit 212, and login information storing unit 213.

On a registration page provided by the administrative server 3, the login information registering unit 211 accepts a user ID and a password (login information) that are input by the user. Moreover, the login information registering unit 211 transmits the login information, which is input by the user, to the administrative server 3. In addition, the login information registering unit 211 stores login information for registration in the login information storing unit 213, such that the login information is associated with information (terminal identification information) that enables the administrative server 3 to identify the user terminal 2.

Here, the login information storing unit 213 is described with reference to FIG. 2. While at least associating the following information with one another, the login information storing unit 213 stores: terminal identification information for identifying the user terminal 2 by the administrative server 3; login information (a user ID and a password) accepted by the login information registering unit 211; and information (for example, a URL) for identifying a service for which user authentication is performed by using the login information. It should be noted that the login information storing unit 213 may also register a type of the login image accepted by the login image registering unit 212, which will be described later.

When login information is registered by way of the login information registering unit 211, the login image registering unit 212 accepts registration of a type of a login image that composes an authentication button for initiating user authentication. Registration of a type of a login image can be performed by way of an arbitrary method, and can be performed, for example, by displaying selectable images on a registration page provided by the administrative server 3, and accepting the user's selection from among a plurality of images. It should be noted that, as the selectable images, images owned by the administrative server 3 may be used, or images owned by the user of the user terminal 2, i.e. images stored in a local disk of the user terminal 2, may be used.

The information on the type of the image (login image ID) accepted by the login image registering unit 212, together with the login information and the terminal identification information accepted by the login information registering unit 211, are transmitted to the administrative server 3.

Login Processing Unit 22

Next, the login processing unit 22 is configured to include authentication page requesting unit 221, authentication page displaying unit 222, and login image determining unit 223.

Based on a predetermined operation by the user, the authentication page requesting unit 221 transmits a request for an authentication page to the administrative server 3. In addition, the authentication page requesting unit 221 transmits terminal identification information for identifying the user terminal 2, together with the request for an authentication page, to the administrative server 3. It should be noted that, in the present embodiment, the authentication page requesting unit 221 requests the first login page as an authentication page that includes an entry field for inputting a user ID and a password (login information).

The authentication page displaying unit 222 displays an authentication page (the first login page) provided from the administrative server 3 in response to the request from the authentication page requesting unit 221. In addition to the entry field for inputting login information, the authentication page provided from the administrative server 3 includes a button selection part, in which an authentication button composed of the login image registered by the login image registering unit 212, and a plurality of operation buttons including dummy buttons composed of images different from the login image are arranged so as to be selectable. Moreover, the authentication page displaying unit 222 refers to the login information storing unit 213, automatically inputs the login information into the entry field on the authentication page provided from the administrative server 3, and displays the authentication page.

The login image determining unit 223 determines a type of an operation button operated by the user among the plurality of operation buttons displayed on the authentication page. In other words, the login image determining unit 223 determines whether the operation button operated by the user is an authentication button or a dummy button.

In a case in which the operation button operated by the user is an authentication button, a request for user authentication based on the login information that was input into the entry field is transmitted to the administrative server 3. On the other hand, in a case in which the operation button operated by the user is a dummy button, the authentication page displaying unit 222 redisplays the authentication page. It should be noted that, although such redisplaying of the authentication page by the authentication page displaying unit 222 will be described later in detail with reference to FIG. 9, the authentication page displaying unit 222 sorts the plurality of operation buttons including an authentication button and a dummy button in a different order, deletes the login information that was input into the entry field, and redisplays the authentication page.

Configuration of Administrative Server 3

Next, a configuration of the administrative server 3 is described. The administrative server 3 is configured to include: a registration processing unit 31 that accepts registration of login information from the user terminal 2; and a login processing unit 32 that performs user authentication based on the login information accepted from the user terminal 2 via an authentication page.

Registration Processing Unit 31

The registration processing unit 31 is configured to include registration accepting unit 311, user information storing unit 312, and login image storing unit 313.

The registration accepting unit 311 accepts login information (a user ID and a password), a type of a login image, and terminal identification information, which are transmitted from the user terminal 2. The registration accepting unit 311 associates such information accepted from the user terminal 2 with one another, and stores the information in the user information storing unit 312.

Here, as shown in FIG. 3, the user information storing unit 312 stores at least information of a user ID, a password and a login image in association with terminal identification information.

The login image storing unit 313 stores image information that compose operation buttons including an authentication button and dummy buttons. More specifically, the login image storing unit 313 stores a category and an attribute of an image in association with an image ID thereof, and stores data on a user who selected the image. It should be noted that a category of an image is information for classifying the images (major classification), and for example, the category is a name of an image representing an object such as a car, a dog or a flower. Furthermore, an attribute of an image is information for further classifying the categorized classification (minor classification), and for example, the attribute is a shape (a car model, a dog species and a flower name) or a color.

As will be described later in detail with reference to FIG. 9, in the authentication system 1, when an authentication page is redisplayed, images belonging to the same category but different attributes may be used to compose operation buttons including an authentication button and dummy buttons in some cases. Categories and attributes are used when such an authentication page is redisplayed.

Login Processing Unit 32

Next, the login processing unit 32 is configured to include request accepting unit 321, login image obtaining unit 322, authentication page transmitting unit 323, and authenticating unit 324.

The request accepting unit 321 accepts a request for an authentication page involving terminal identification information, from the authentication page requesting unit 221 of the user terminal 2.

The login image obtaining unit 322 identifies the user terminal 2 by using the terminal identification information accepted by the request accepting unit 321, and obtains, from the login image storing unit 313, a login image registered by the user of the user terminal 2. In addition, the login image obtaining unit 322 obtains images other than the login image, together with the login image. It should be noted that, as the other images, the login image obtaining unit 322 may obtain images of which categories are at least different from the category of the login image.

The authentication page transmitting unit 323 transmits an authentication page (the first login page) to the user terminal 2. Moreover, the transmitted authentication page includes a plurality of operation buttons that include an authentication button composed of the login image obtained by the login image obtaining unit 322, and dummy buttons composed of other images similarly obtained.

When a request for user authentication is accepted from the user terminal 2, the authenticating unit 324 refers to the user information storing unit 312, and performs user authentication based on the login information that was input into the entry field of the authentication page (the first login page).

Hardware Configuration of Authentication System 1

The hardware of the user terminal 2 and the administrative server 3, which configure the authentication system 1 described above, can be configured with one or a plurality of general computers. Such a general computer includes, for example, a central processing unit (CPU) as a control unit. In addition, such a general computer appropriately includes: memory (RAM, ROM), a hard disk (HDD), an optical disk (CD, DVD), etc. as a storage unit; various types of wired/wireless LAN communication device as a network communication device; various types of display such as, for example, a liquid crystal display, a plasma display, etc. as a display unit; and a keyboard and a pointing device (mouse, tracking ball), for example, as an input device; and these units are connected via a bus line. In such a general computer, the CPU controls the user terminal 2 and the administrative server 3 in an integrated manner, and appropriately reads and executes various programs, thereby collaborating with the hardware described above, and implementing various functions according to the present invention.

Operations of Authentication System 1

Next, operations of the authentication system 1 of the present invention are described with reference to FIGS. 5 to 9.

Registration Processing

At first, registration processing by the authentication system 1 is described with reference to FIGS. 5 and 6. FIG. 5 is a flowchart showing a flow of the registration processing; and FIG. 6 is diagram showing an example of operations in the registration processing.

Steps S1 to S3 are described with reference to FIG. 5. The user terminal 2 requests a registration page to the administrative server 3 (Step S1), the administrative server 3 transmits a registration page to the user terminal 2 (Step S2), and the transmitted registration page is displayed on the user terminal 2 (Step S3).

Figure 6:
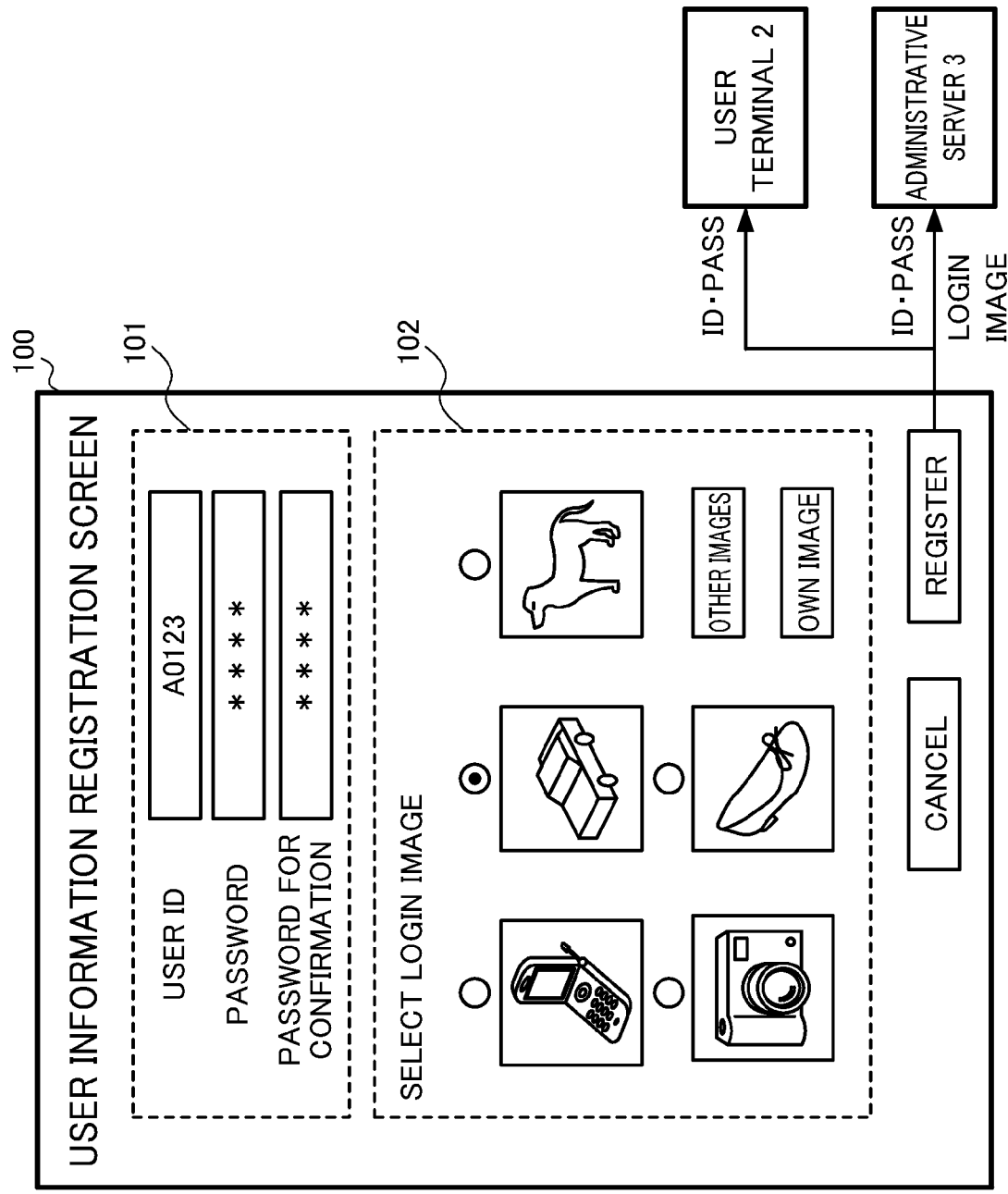
FIG. 6 is a diagram showing operations of the registration processing of the authentication system.

More specifically, with reference to FIG. 6, when a registration page is requested, the administrative server 3 generates and transmits a registration page 100 to the user terminal 2, in which the registration page 100 includes: an entry field 101 for accepting inputs of a user ID and a password (login information); and an image selection field 102 for accepting selection of a login image.

Here, when the registration page 100 is requested, the administrative server 3 extracts an arbitrary number of images (for example, five images) as images to be displayed in the image selection field 102, from the login image storing unit 313.

Moreover, the image selection field 102 may include: an "other-images button" for requesting images different from the arbitrary number of images currently displayed; and an "own-image button" for storing an image, which is stored in the local disk of the user terminal 2, as a login image. When the "other-images button" is operated, a request for obtaining images is transmitted to the administrative server 3, and other images extracted from the login image storing unit 313 are displayed afresh. Moreover, when the "own-image button" is operated, a selection field for selecting an image in the local disk is displayed.

Steps S4 and S5 are described with reference to FIG. 5. When the login information registering unit 211 of the user terminal 2 accepts an input of login information via the entry field 101, and the login image registering unit 212 accepts selection of a login image via the image selection field 102, information indicating the login information and a type of the login image is transmitted from the user terminal 2 to the administrative server 3 (Step S4). In addition, the user terminal 2 transmits terminal identification information, together with the login information and the login image, to the administrative server 3. Moreover, the login information storing unit 213 of the user terminal 2 at least stores the login information and the terminal identification information transmitted to the administrative server 3.

Step S6 is described. When the information indicating the terminal identification information, the login information and the type of the login image is received from the user terminal 2, the registration accepting unit 311 associates such information with one another, and stores the information in the user information storing unit 312 (Step S6).

More specifically, with reference to FIG. 6, on the registration page 100, when the user of the user terminal 2 inputs login information into the entry field 101, selects a login image in the image selection field 102, and operates a "registration button", the user information is registered. In other words, the registration accepting unit 311 of the administrative server 3 accepts the login information that was input into the entry field 101, and the login image that was selected in the image selection field 102, together with the terminal identification information for identifying the user terminal 2, thereby registering the user information (to be stored into the user information storing unit 312). Moreover, the login information storing unit 213 of the user terminal 2 stores the login information that was input into the entry field 101.

It should be noted that, in a case in which an image in the local disk is selected as a login image, when registering the user information, the image may be transmitted from the user terminal 2 to the administrative server 3, or only an address of the image in the local disk may be transmitted from the user terminal 2 to the administrative server 3.

Login Processing

Figure 7:
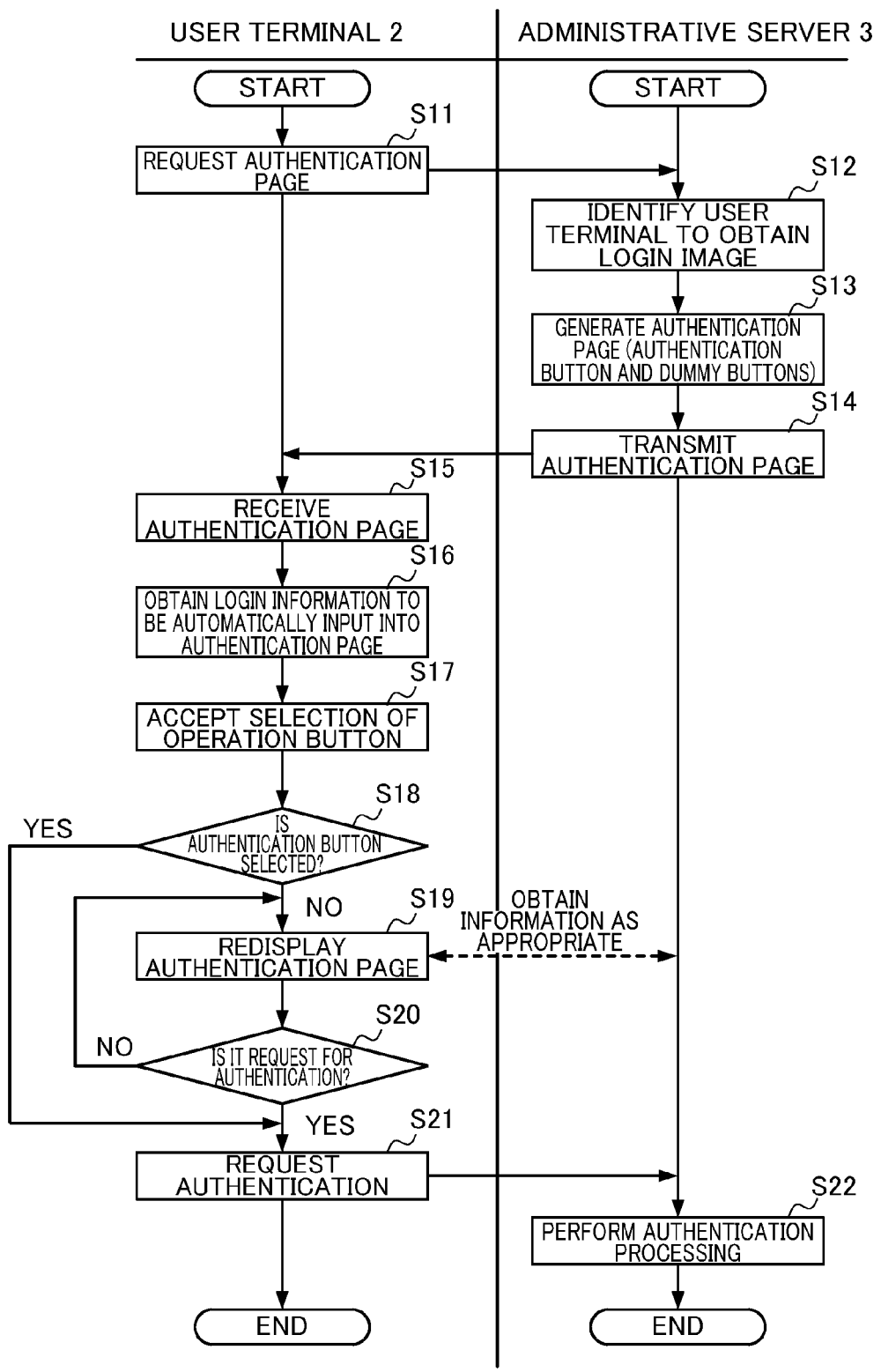
FIG. 7 is a flowchart showing a flow of login processing of the authentication system.

Next, login processing by the authentication system 1 is described with reference to FIGS. 7 to 9. FIG. 7 is a flowchart showing a flow of the login processing; and FIGS. 8 and 9 are diagrams showing an example of operations in the login processing.

Step S11 is described with reference to FIGS. 7 and 8 (1). In response to an operation by the user, the authentication page requesting unit 221 of the user terminal 2 transmits a request for an authentication page (the first login page) to the administrative server 3 (Step S11). In addition, the authentication page requesting unit 221 transmits terminal identification information, together with the request, to the administrative server 3.

Step S12 is described with reference to FIG. 7. When the request for an authentication page is accepted from the user terminal 2, the login image obtaining unit 322 of the administrative server 3 identifies the user terminal 2 based on the terminal identification information, and obtains a login image, which was registered by way of the user terminal 2 in the registration processing, from the login image storing unit 313 (Step S12). Moreover, the login image obtaining unit 322 obtains images other than the login image from the login image storing unit 313.

Subsequently, in Step S13, the login image obtaining unit 322 generates an authentication page, in which an authentication button composed of the obtained login image and dummy buttons composed of other images are arranged at random (Step S13).

Subsequently, in Step S14, the authentication page transmitting unit 323 transmits the generated authentication page to the user terminal 2.

Steps S15 and S16 are described. When the user terminal 2 receives the authentication page (Step S15), the authentication page displaying unit 222 obtains login information stored in the login information storing unit 213, automatically inputs the login information into the entry field of the authentication page, and displays the authentication page (Step S16).

With reference to FIG. 8 (2), the user terminal 2 displays the authentication page 110 that includes the entry field 111 with the user ID and the password (login information) being automatically input thereinto, and the button selection part 112 that displays a plurality of operation buttons. Furthermore, in addition to an authentication button 112C (the first login button) composed of the login image registered by the user terminal 2, dummy button 112A, 112B, 112D and 112E composed of images different from the login image are displayed in the button selection part 112. Here, the operation button 112C is an operation button (the first login button) that transmits, when operated, a request for user authentication based on the login information, which was input into the entry field 111, to the administrative server 3; and the dummy buttons 112A, 112B, 112D and 112E are operation buttons that do not transmit, even if operated, a request for user authentication to the administrative server 3.

Steps S17, S18 and S21 are described with reference to FIG. 7. In the button selection part 112 of the displayed authentication page 110, the user terminal 2 accepts selection of an operation button from the user (Step S17). Subsequently, the login image determining unit 223 determines whether the selected operation button is the authentication button 112C (Step S18). In a case in which the selected operation button is the authentication button 112C, the login image determining unit 223 transmits a request for user authentication based on the login information, which was input into the entry field 111, to the administrative server 3 (Step S21).

When the request for user authentication is accepted, in Step S22, the administrative server 3 performs predetermined authentication processing, i.e. refers to the user information storing unit 312, and determines whether the login information accepted via the entry field 111 is correct (Step S22).

Here, the login information, which was stored during the registration processing, is automatically input into the entry field 111 of the authentication page 110. Accordingly, in a case in which the authentication button 112C is selected on the authentication page 110, authentication will succeed as shown in FIG. 8 (3). In this way, according to the authentication system 1 of the present invention, it is possible to achieve improvement of security through selection of the authentication button 112C, while securing the usability through an automatic input into the entry field 111.

Moreover, in the user authentication, the user is only required to select the authentication button 112C, and is not required to perform any other operations. Here, for the user who recognizes the login image that composes the authentication button 112C, selection of the authentication button 112C is not different from selection of the first login button, which requires the user to perform in conventional authentication systems. Therefore, according to the authentication system 1 of the present invention, security can be improved as compared to the security of conventional authentication systems, only by requesting the user to perform operations involving the same number of operations as that of the conventional authentication systems.

Steps S18 and S19 are described with reference to FIG. 7. In Step S18, in a case of determining that the selected operation button is not the authentication button 112C, i.e. the selected operation button is any of the dummy buttons 112A, 112B, 112D and 112E, the authentication page displaying unit 222 redisplays the authentication page (Step S19).

In other words, in a case in which any of the dummy buttons 112A, 112B, 112D and 112E is selected on the authentication page 110, the user authentication will fail as shown in FIG. 8 (4). In this case, the authentication system 1 of the present invention redisplays the authentication page. Incidentally, when the authentication page is redisplayed, if the authentication page 110 shown in FIG. 8 (2) is displayed without any change, i.e. if the button selection part 112 is displayed without any change, even a third party who does not know the login image may be able to succeed in user authentication by attempting to select operation buttons several times. Accordingly, the number of times the authentication page is redisplayed may be limited to a predetermined number of times (for example, three times). Moreover, as shown in FIG. 9, an authentication page may be redisplayed in a different manner from that of the authentication page 110 (FIG. 8 (2)).

A manner of redisplaying the authentication page is described with reference to FIG. 9.

With reference to FIG. 9 (4-1), in a case in which the authentication page is redisplayed, the authentication page displaying unit 222 may display an authentication page 120 that includes a button selection part 122, in which the plurality of operation buttons to be displayed (the authentication button 122C, the dummy button 122A, 122B, 122D and 122E) are sorted in a different order (i.e. the order of the buttons is different from the order thereof on the authentication page 110). In this case, login information may be automatically input into the entry field 121, or login information may be deleted depending on the number of times of redisplaying. In this way, by sorting the plurality of operation buttons to be displayed in the button selection part 122 in a different order, it is possible to prevent the authentication button 122C from being easily selected.

In addition, in a case in which the authentication page is redisplayed, the authentication page displaying unit 222 may display an authentication page by changing an attribute(s) without changing a category of an image(s) that composes one or a plurality of operation buttons among the plurality of operation buttons to be displayed. For example, an image of "white dog" that composes the dummy button 112A on the authentication page 110 is changed to an image of "black dog" in a dummy button 122A on the authentication page 120. In this case, the operation button, of which attribute is changed, may be dummy button or an authentication button.

Furthermore, in a case in which the authentication page is redisplayed, the authentication page displaying unit 222 may display an authentication page (not shown) by changing one or a plurality of dummy buttons among the plurality of operation buttons to be displayed. Similarly, the authentication page displaying unit 222 may display an authentication page (not shown) by adding one or a plurality of dummy buttons as a plurality of operation buttons to be displayed. In this case, the number of dummy buttons to be changed or added may be determined depending on the number of times of redisplaying (as the number of times of redisplaying is increased, the number of dummy buttons to be changed or added may be increased).

It should be noted that the authentication page displaying unit 222 may redisplay an authentication page by: sorting operation buttons in a different order; changing an attribute of operation buttons; changing dummy buttons; and adding dummy buttons as described above, or may redisplay an authentication page by applying combination of the plurality of such manners.

Moreover, with reference to FIG. 9 (4-2), in a case in which the authentication page is redisplayed, the authentication page displaying unit 222 may display an authentication page 130, in which a user ID and a password (login information) are not automatically input into an entry field 131 for inputting login information. In this case, the authentication page displaying unit 222 may display a "login button" and a "cancel button", which are displayed on the existing first login page, in the button selection part 132. As a result, even a user who forgot the login image can enjoy user authentication by inputting login information.

It should be noted that, when the authentication page is redisplayed, the authentication page displaying unit 222 shall appropriately obtain necessary information from the administrative server 3. In other words, information on dummy buttons to be changed or added or the like, and an authentication page to be redisplayed per se are appropriately obtained from the administrative server 3 as necessary.

Steps S20 and S21 are described with reference to FIG. 7. On the authentication page thus redisplayed, in a case in which a predetermined operation is performed (for example, the authentication button 122C is selected (FIG. 9 (4-1)), or the login button is selected (FIG. 9 (4-2)) (Step S20), the user terminal 2 transmits a request for user authentication to the administrative server 3 (Step S21).

When the request for user authentication is accepted, in Step S22, the administrative server 3 performs predetermined authentication processing, i.e. refers to the user information storing unit 312 to determine whether the login information accepted via the entry field 111 is correct (Step S22).

The authentication system 1 of the first embodiment has been described above. According to the authentication system 1, it is possible to achieve improvement of security, while securing the usability through an automatic input, as described above.

Second Embodiment

Figure 10:
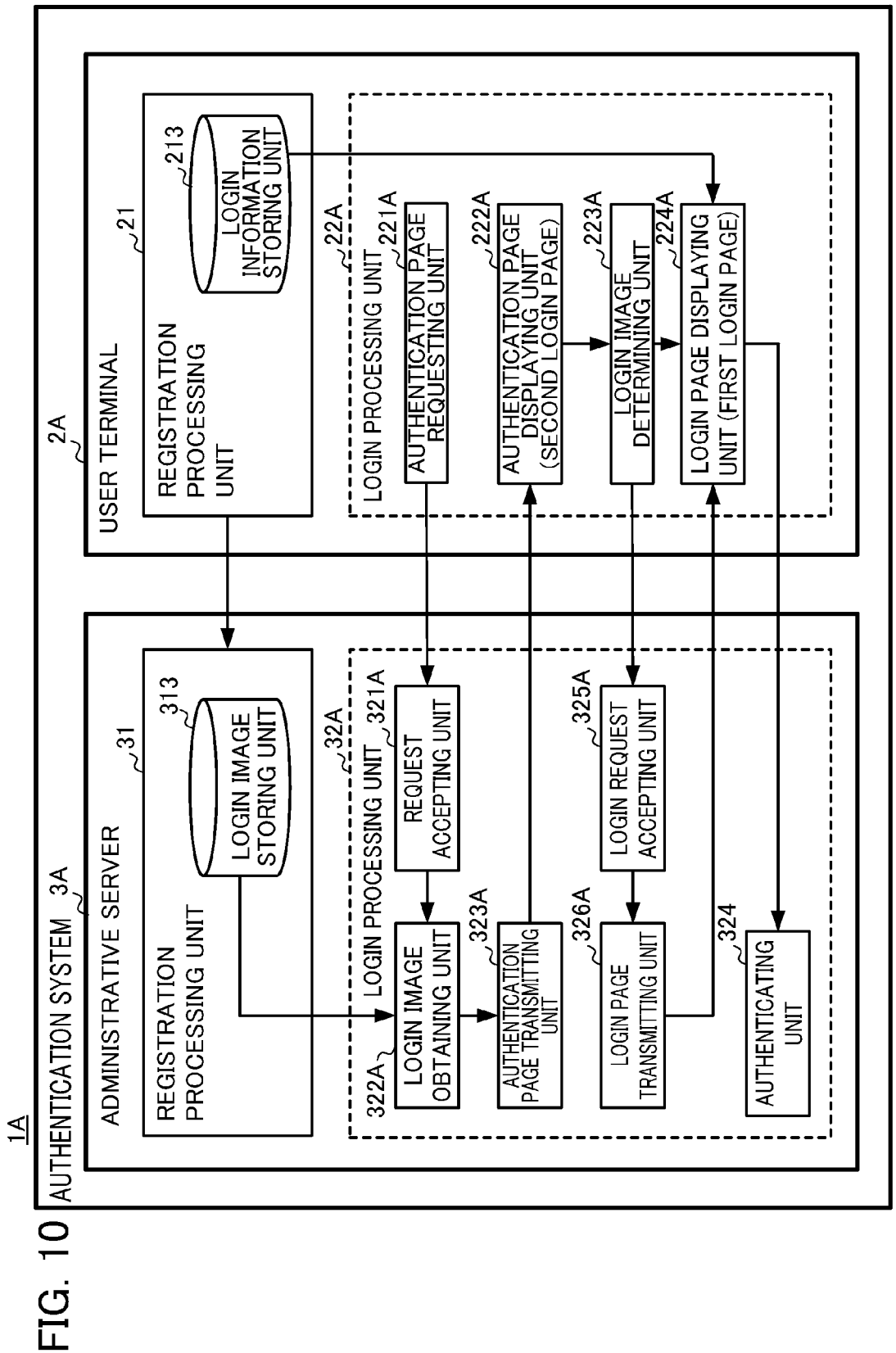
FIG. 10 is a diagram showing a configuration of an authentication system of a second embodiment.

Next, an authentication system 1A of a second embodiment is described with reference to FIGS. 10 and 11. The authentication system 1 of the first embodiment displays a plurality of operation buttons on the first login page including the entry field, whereas the authentication system 1A of the second embodiment displays a plurality of operation buttons on a second login page before transitioning to the first login page, which is a difference therebetween.

Configuration of Authentication System 1A

A configuration of the authentication system 1A of the second embodiment is described with reference to FIG. 10. It should be noted that configurations similar to those of the authentication system 1 of the first embodiment are assigned with the same reference numerals, and a detailed description thereof is omitted.

The authentication system 1A is configured to include a user terminal 2A and an administrative server 3A. It should be noted that a hardware configuration of the user terminal 2A and the administrative server 3A can be implemented with a general computer described above.

User Terminal 2A

The user terminal 2A is configured to include the registration processing unit 21 and a login processing unit 22A.

The login processing unit 22A is configured to include authentication page requesting unit 221A, authentication page displaying unit 222A, login image determining unit 223A, and login page displaying unit 224A.

Based on a predetermined operation by the user, the authentication page requesting unit 221A transmits a request for an authentication page to the administrative server 3A. In addition, the authentication page requesting unit 221A transmits terminal identification information for identifying the user terminal 2A, together with the request for an authentication page, to the administrative server 3A. It should be noted that, in the present embodiment, the authentication page requesting unit 221A requests the second login page as an authentication page.

The authentication page displaying unit 222A displays an authentication page (the second login page) provided from the administrative server 3A in response to the request from the authentication page requesting unit 221A. The authentication page provided from the administrative server 3A includes an authentication button composed of a login image registered by the registration processing unit 21 (the login image registering unit 212), and a plurality of operation buttons including dummy buttons composed of images different from the login image.

The login image determining unit 223A determines a type of an operation button (authentication button or dummy button) operated by the user among the plurality of operation buttons displayed on the authentication page, and transmits a request for the first login page, together with a result of such determination, to the administrative server 3A. Moreover, the login image determining unit 223A transmits data on the determined type of the operation button to the login page displaying unit 224A.

The login page displaying unit 224A displays the first login page provided from the administrative server 3A in response to the request from the login image determining unit 223A. In addition, depending on the data on the type of the operation button transmitted from the login image determining unit 223A, the login page displaying unit 224A automatically inputs login information into an entry field. In other words, in a case in which the login image determining unit 223A determines that the authentication button was operated, the login page displaying unit 224A displays the first login page, in which login information has been automatically input into the entry field; and in a case in which the login image determining unit 223A determines that a dummy button was operated, the login page displaying unit 224A displays the first login page without login information being input into the entry field.

Furthermore, in a case in which a predetermined operation is performed (the login button is operated) on the first login page, the login page displaying unit 224A transmits a request for user authentication to the administrative server 3A.

Administrative Server 3A

Next, the administrative server 3A is configured to include the registration processing unit 31 and a login processing unit 32A.

The login processing unit 32A is configured to include request accepting unit 321A, login image obtaining unit 322A, authentication page transmitting unit 323A, login request accepting unit 325A, login page transmitting unit 326A, and the authenticating unit 324.

The request accepting unit 321A accepts a request for an authentication page (the second login page) involving terminal identification information, from the authentication page requesting unit 221A of the user terminal 2A.

From the login image storing unit 313, the login image obtaining unit 322A obtains a login image registered by the user of the user terminal 2A identified by way of the terminal identification information, and obtains other images different from the login image.

The authentication page transmitting unit 323A transmits an authentication page (the second login page) to the user terminal 2A, in which the authentication page displays a plurality of operation buttons that include an authentication button composed of the login image obtained by the login image obtaining unit 322A, and dummy buttons composed of other images similarly obtained.

The login request accepting unit 325A accept a request for the first login page from the user terminal 2A via the authentication page (the second login page).

The login page transmitting unit 326A transmit the first login page, which includes the entry field for inputting login information, to the user terminal 2A.

In response to a request for user authentication from the user terminal 2A, the authenticating unit 324 performs predetermined user authentication.

Operations of Authentication System 1A

Next, operations of the authentication system 1A of the second embodiment are described with reference to FIG. 11.

With reference to FIG. 11 (1), the user terminal 2A displays an authentication page 140 (the second login page) that was transmitted from the authentication page transmitting unit 323A of the administrative server 3A in response to a request from the authentication page requesting unit 221A. Here, a button selection part 142 is displayed on the authentication page 140, in which a plurality of operation buttons (an authentication button 142C, dummy buttons 142A, 142B, 142D and 142E) for transitioning to the first login page are arranged to be selectable in the button selection part 142.

In addition, in a case in which the authentication button 142C is operated on the authentication page 140, as shown in FIG. 11 (2), the user terminal 2A displays the first login page 150 that includes an entry field 151, into which login information has been automatically input. As a result, the user of the user terminal 2A can enjoy user authentication by only operating the "login button (the first login button)".

On the other hand, in a case in which any of the dummy buttons 142A, 142B, 142D and 142E is operated on the second authentication page 140, as shown in FIG. 11 (3), the user terminal 2A displays the first login page 160 that includes an entry field 161 without login information being input thereinto. As a result, a third party who does not know the authentication button 142C (the login image) cannot enjoy an automatic input of login information, thereby making it possible to prevent the third party from spoofing.

According to the authentication system 1A of the second embodiment as described above, it is possible to achieve improvement of security, while securing the usability through an automatic input. In other words, an operation required to display the first login page 150, into which login information has been automatically input, is only selection of the authentication button 142C, which corresponds to selection of the second login button required in conventional authentication systems; therefore, security can be improved as compared to the security of conventional authentication systems, by way of the same number of operations as that of the conventional authentication systems.

It should be noted that, although the first login page without login information being input thereinto is displayed in a case in which the authentication button 142C is not operated in the second embodiment, the authentication page (the second login page) may be redisplayed in a case in which the authentication button 142C is not operated, similarly to the first embodiment. Various manners of redisplaying as described above can be applied to such a case.

MODIFIED EMBODIMENT

Although the embodiments of the present invention have been described above, the present invention is not limited to the aforementioned embodiments. Moreover, the effects described in the embodiments of the present invention are merely enumeration of the most preferred effects arising from the present invention, and the effects according to the present invention are not limited to the effects described in the embodiments of the present invention.

For example, in the aforementioned embodiments, the plurality of operation buttons (the authentication button and the dummy buttons) are simultaneously displayed on the authentication page (the first login page or the second login page); however, a manner of displaying the operation buttons on the authentication page is not limited thereto. For example, with reference to FIG. 12, a button selection part 171 that switches to display a plurality of operation buttons may be displayed on an authentication page 170 (FIG. 12 (1)). More specifically, as shown in FIG. 12 (2), the plurality of operation buttons may be temporally switched to be displayed in sequence. It should be noted that, although only one operation button is displayed on the button selection part 171 at one time by temporally switching the operation buttons in FIG. 12, such a manner does not prevent the plurality of operation buttons from being simultaneously displayed and temporally switched.

In such a case, the login image determining unit 223 or 223A determines a type of an operation button displayed in the button selection part 171 at the timing when a selection operation is accepted from the user.

Moreover, in the aforementioned embodiments, determination of a type of an operated operation button (determination by way of the login image determining unit 223 or 223A) is performed at the user terminal 2 or 2A. Here, such determination of a type of an operation button at the user terminal 2 or 2A can be implemented, for example, by way of the user terminal 2 or 2A (browser) executing a script program included in an authentication page. However, since the program is included in the authentication page, and is transmitted to the user terminal 2 or 2A, spoofing by a third party is possible if the program is analyzed.

Accordingly, determination of a type of an operated operation button may be performed at the administrative server 3 or 3A. In this case, determination can be implemented by the user terminal 2 or 2A transmitting information on the type of the operated operation button to the administrative server 3 or 3A, and the administrative server 3 or 3A determining whether the authentication button was operated, based on the information.

EXPLANATION OF REFERENCE NUMERALS

1, 1A authentication system
2, 2A user terminal
21 registration processing unit
211 login information registering unit
212 login image registering unit
213 login information storing unit
22, 22A login processing unit
221, 221A authentication page requesting unit 222, 222A authentication page displaying unit
223, 223A login image determining unit
224A login page displaying unit
3, 3A administrative server
31 registration processing unit
311 registration accepting unit
312 user information storing unit
313 login image storing unit
32, 32A login processing unit
321, 321A request accepting unit
322, 322A login image obtaining unit
323, 323A authentication page transmitting unit
324 authenticating unit
325A login request accepting unit
326A login page transmitting unit

The invention claimed is:

1. An authentication system including a user terminal and an administrative server, the authentication system performing user authentication based on login information that includes a user ID and a password for identifying a user, the authentication system comprising:
   a registration accepting unit for accepting registration of a type of a login image that composes an authentication button for initiating the user authentication when the login information is registered, the registration accepting unit being arranged in the administrative server;
   a login image obtaining unit for generating an authentication page on the user terminal in response to a request from the user terminal, the authentication page displaying a plurality of operation buttons that include an authentication button composed of the login image accepted by the registration accepting unit and dummy buttons composed of images different from the login image, the login image obtaining unit being arranged in the administrative server;
   an authentication page displaying unit for displaying the authentication page in a state where the login information has been automatically input into an entry field of the authentication page generated by the login image obtaining unit, the authentication page displaying unit being arranged in the user terminal;
   a login image determining unit for determining a type of an operation button selected on the authentication page by a user of the user terminal, and for transmitting the login information being input into the entry field to the administrative server in a case in which the operation button thus selected is the authentication button, the login image determining unit being arranged in the user terminal; and
   an authenticating unit for performing the user authentication, based on determining whether the login information is correct, the authenticating unit being arranged in the administrative server.

2. The authentication system according to claim 1,
   wherein the authentication page is a first login page that includes the plurality of operation buttons and the entry field that accepts an input of the login information, and
   wherein the authentication page displaying unit displays the first login page including the plurality of operation buttons on the user terminal, in which the login information has been automatically input into the entry field.

3. The authentication system according to claim 2,
   wherein the authentication page displaying unit displays, on the user terminal, the first login page including an entry field without the login information being input thereinto, on condition that the login image determining unit determines that any one of the dummy buttons was selected.

4. The authentication system according to claim 1,
   wherein the authentication page is a second login page that can transition to a first login page including the entry field that accepts an input of the login information,
   wherein the authentication system further comprises login page displaying unit for displaying the first login page, in which the login information has been automatically input into the entry field, on the user terminal, on condition that the login image determining unit determines that the authentication button was selected, and
   wherein the authenticating unit performs the user authentication via the first login page.

5. The authentication system according to claim 1,
   wherein the authentication page displaying unit simultaneously displays the plurality of operation buttons.

6. The authentication system according to claim 5,
   wherein the authentication page displaying unit redisplays the authentication page, by sorting the plurality of operation buttons in a different order, on condition that the login image determining unit determines that any one of the dummy buttons was selected.

7. The authentication system according to claim 5,
   wherein the authentication page displaying unit redisplays the authentication page, by changing a shape or color of one or a plurality of images among images that compose the plurality of operation buttons, on condition that the login image determining unit determines that any one of the dummy buttons was selected.

8. The authentication system according to claim 1,
   wherein the authentication page displaying unit replaces the plurality of operation buttons with a plurality of other operation buttons to be displayed at a predetermined time interval.

9. The authentication system according to claim 8,
   wherein the authentication page displaying unit redisplays the authentication page, by changing a shape or color of one or a plurality of images among images that compose the plurality of operation buttons, on condition that the login image determining unit determines that any one of the dummy buttons was selected.

10. A method of performing user authentication based on login information that includes a user ID and a password for identifying a user, the method comprising the steps executed by a computer:
    accepting registration of a type of a login image that composes an authentication button for initiating the user authentication when the login information is registered;
    generating an authentication page in response to a request from a user terminal, the authentication page displaying a plurality of operation buttons that include an authentication button composed of the login image accepted and dummy buttons composed of images different from the login image;
    displaying the authentication page in a state where the login information has been automatically input into an entry field of the authentication page;
    determining a type of an operation button selected on the authentication page by a user of the user terminal and transmitting the login information being input into the entry field to an administrative server in a case in which the operation button thus selected is the authentication button; and
    performing the user authentication, and transmitting the login information being input into the entry field to an administrative server in a case in which the operation button thus selected is the authentication button.

11. A non-transitory storage medium having instructions stored thereon which when executed cause a user's computing device to perform operations comprising:
   requesting login credentials of a user comprising a user ID and a password;
   causing a first plurality of images to be displayed to the user, wherein one of the first plurality of images is predefined as an authenticating image and the other images are dummy;
   receiving input from the user of the user ID, the password and the user's selection of one of the first plurality of images;
   causing the user to be authenticated based upon the input from the user of the user ID, the password and the user's selection of one of the first plurality of images, and determining that the user is not authentic if the user has selected any of the dummy images of the first plurality of images.

12. The non-transitory storage medium of claim 11 wherein authenticating the user based upon the input from the user of the user ID and the password is performed by an administrative server, and authenticating the user's selection of one of the first plurality of images is performed by a user terminal which is physically distinct from the administrative server.

13. The non-transitory storage medium of claim 11 having further instructions stored thereon which when executed cause the user's computing device to perform operations comprising, if the user has selected any of the dummy images:
   causing a second plurality of images to be displayed to the user, the display of the second plurality of images is different from the display of the first plurality of images according to at least one of sorting the images in a different order, changing an attribute of at least one of the images; replacing at least one of the dummy images, and adding dummy images;
   causing the user to be authenticated based upon the input from the user of the user ID, the password and the user's selection of one of the second plurality of images, and determining that the user is not authentic if the user has selected any of the dummy images of the second plurality of images.

* * * * *